US011983285B1

(12) United States Patent
Du et al.

(10) Patent No.: US 11,983,285 B1
(45) Date of Patent: May 14, 2024

(54) SECURE MULTI-PARTY COMPUTATION AND COMMUNICATION

(71) Applicant: Lemon Inc., Grand Cayman (KY)

(72) Inventors: Jian Du, Culver City, CA (US); Haohao Qian, Beijing (CN); Yongjun Zhao, Beijing (CN); Bo Jiang, Culver City, CA (US); Chuyuan Chen, Beijing (CN); Qiang Yan, Beijing (CN)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/490,953

(22) Filed: Oct. 20, 2023

Related U.S. Application Data

(62) Division of application No. 18/297,545, filed on Apr. 7, 2023, now Pat. No. 11,836,263.

(51) Int. Cl.
*H04L 29/06* (2006.01)
*G06F 7/507* (2006.01)
*G06F 21/62* (2013.01)
*H04L 9/08* (2006.01)

(52) U.S. Cl.
CPC .............. *G06F 21/62* (2013.01); *G06F 7/507* (2013.01); *H04L 9/0869* (2013.01)

(58) Field of Classification Search
CPC ......... G06F 21/62; G06F 7/507; H04L 9/0869
See application file for complete search history.

(56) References Cited

U.S. PATENT DOCUMENTS

| 7,058,603 B1 | 6/2006 | Rhiando |
| 9,652,622 B2 | 5/2017 | Garfinkle et al. |
| 10,289,816 B1 | 5/2019 | Malassenet et al. |
| 11,522,688 B2 | 12/2022 | Goodsitt et al. |
| 11,593,510 B1 | 2/2023 | Knox et al. |
| 11,704,431 B2 | 7/2023 | Kraus et al. |

(Continued)

FOREIGN PATENT DOCUMENTS

CN 116049626 A 5/2023

OTHER PUBLICATIONS

Du et al., DP-PSI: Private and secure set intersection, Aug. 28, 2022, Cornel University, https://doi.org/10.48550/arXiv.2208.13249V1, p. 1-9. (Year: 2022).

(Continued)

*Primary Examiner* — Jason K Gee
(74) *Attorney, Agent, or Firm* — HSML P.C.

(57) ABSTRACT

Protecting data privacy in secure multi-party computation and communication is provided. A method of protecting data privacy includes determining a differential privacy configuration, determining a number of iterations based on a first parameter and a second parameter, and for each of the number of iterations generating a random value and a random noise data; generating a first message and a second message; and performing a transfer based on the first message, the second message, and an input data to output one of the first message and the second message. The method also includes generating a first noise data based on the random noise data in each of the number of iterations, generating a first share based on a first dataset and a second dataset, applying the first noise data to the first share, and constructing a result based on the first share and a second share.

20 Claims, 5 Drawing Sheets

(56) References Cited

U.S. PATENT DOCUMENTS

| | | |
|---|---|---|
| 2004/0179686 A1 | 9/2004 | Matsumura et al. |
| 2010/0131764 A1 | 5/2010 | Goh |
| 2011/0202764 A1 | 8/2011 | Furukawa |
| 2012/0143922 A1* | 6/2012 | Rane .................. G06F 21/6245 707/E17.005 |
| 2013/0212690 A1* | 8/2013 | Fawaz .................. G06F 21/60 726/26 |
| 2016/0150047 A1 | 5/2016 | O'Hare et al. |
| 2018/0101697 A1* | 4/2018 | Rane ...................... H04L 9/085 |
| 2019/0065775 A1 | 2/2019 | Klucar |
| 2019/0244138 A1 | 8/2019 | Bhowmick et al. |
| 2019/0361794 A1 | 11/2019 | Maksyutov et al. |
| 2020/0250335 A1 | 8/2020 | Hockenbrocht et al. |
| 2020/0401726 A1 | 12/2020 | Lim et al. |
| 2021/0073677 A1 | 3/2021 | Peterson et al. |
| 2021/0173856 A1 | 6/2021 | Chitnis et al. |
| 2021/0336771 A1 | 10/2021 | Mukherjee |
| 2021/0360010 A1 | 11/2021 | Zaccak et al. |
| 2021/0399874 A1 | 12/2021 | Polyakov et al. |
| 2022/0100899 A1 | 3/2022 | Saillet et al. |
| 2022/0138348 A1 | 5/2022 | Bernau et al. |
| 2022/0244988 A1 | 8/2022 | Zhang et al. |
| 2022/0277097 A1 | 9/2022 | Cabot et al. |
| 2022/0335450 A1 | 10/2022 | Fenton et al. |
| 2022/0405800 A1 | 12/2022 | Walcott et al. |
| 2023/0004555 A1 | 1/2023 | Moreno et al. |
| 2023/0017374 A1* | 1/2023 | Boehler .............. G06F 21/6245 |
| 2023/0125887 A1 | 4/2023 | Habite et al. |
| 2023/0146259 A1 | 5/2023 | Liktor et al. |
| 2023/0214684 A1 | 7/2023 | Wang et al. |

OTHER PUBLICATIONS

Office Action issued in U.S. Appl. No. 18/297,447, dated Jul. 12, 2023 (14 pages).

Notice of Allowance issued in U.S. Appl. No. 18/297,530, dated Oct. 25, 2023 (26 pages).

Office Action issued in U.S. Appl. No. 28/297,339, dated Aug. 3, 2023 (30 pages).

Case, Benjamin et al. "The Privacy-preserving Padding Problem: Non-negative Mechanisms for Conservative Answers with Differential Privacy." 20 pages. Oct. 15, 2021. https://arxiv.org/abs/2110.08177.

Office Action issued in U.S. Appl. No. 18/297,376, dated Jun. 12, 2023 (15 pages).

Office Action issued in U.S. Appl. No. 18/297,389, dated Jul. 11, 2023 (11 pages).

Office Action issued in U.S. Appl. No. 18/297,405, dated Jun. 14, 2023 (17 pages).

Kairouz, Peter, Sewoong Oh, and Pramod Viswanath. "The composition theorem for differential privacy." International conference on machine learning. PMLR, 2015. (Year: 2015).

Office Action issued in U.S. Appl. No. 18/297,424, dated Jun. 20, 2023 (12 pages).

Notice of Allowance issued in U.S. Appl. No. 18/297,424, dated Aug. 2, 2023 (11 pages).

Notice of Allowance issued in U.S. Appl. No. 18/297,376, dated Aug. 30, 2023 (8 pages).

Notice of Allowance issued in U.S. Appl. No. 18/297,389, dated Aug. 7, 2023 (7 pages).

Notice of Allowance issued in U.S. Appl. No. 18/297,405, dated Aug. 30, 2023 (9 pages).

Buddhavarapu et al., "Private matching for compute", Cryptology ePrint Archive, 2020, https://eprint.iacr.org/2020/599.

Guo et al., "Birds of a Feather Flock Together: How Set Bias Helps to Deanonymize You via Revealed Intersection Sizes", 31st USENIX Security Symposium, Aug. 10-12, 2022, Boston, MA, USA, https://www.usenix.org/conference/usenixsecurity22/presentation/guo.

Ion et al., "On Deploying Secure Computing: Private Intersection-Sum-with-Cardinality", 2020 IEEE European Symposium on Security and Privacy (EuroS&P), Date of Conference: Sep. 7-11, 2020, Date added to IEEE Xplore: Nov. 2, 2020, https://www.researchgate.net/publication/346584438_On_Deploying_Secure_Computing_Private_Intersection-Sum-with-Cardinality.

Chandran et al., "Circuit-PSI with Linear Complexity via Relaxed Batch OPPRF", Cryptology ePrint Archive, received Jan. 12, 2021, https://eprint.iacr.org/2021/034.

Pinkas et al., "SpOT-Light: Lightweight Private Set Intersection from Sparse OT Extension", Cryptology ePrint Archive, https://eprint.iacr.org/2019/634.

Chase et al., "Secret Shared Shuffle", Cryptology ePrint Archive, https://eprint.iacr.org/2019/1340.

Mohassel et al., "How to Hide Circuits in MPC: An Efficient Framework for Private Function Evaluation", Cryptology ePrint Archive, https://eprint.iacr.org/2013/137.

Garimella et al., "Private Set Operations from Oblivious Switching", Cryptology ePrint Archive, https://eprint.iacr.org/2021/243.

Dwork et al., "Differential Privacy and Robust Statistics", Association for Computing Machinery, May 31, 2009, pp. 371-380, https://dl.acm.org/doi/10.1145/1536414.1536466.

Dwork et al., "Differential Privacy Under Continual Observation", Association for Computing Machinery, Jun. 5, 2010, pp. 715-724, https://dl.acm.org/doi/10.1145/1806689.1806787.

Dwork et al. "Our Data, Ourselves: Privacy via Distributed Noise Generation", Advances in Cryptology-EUROCRYPT 2006: 24th Annual International Conference on the Theory and Applications of Cryptographic Techniques, St. Petersburg, Russia, May 28-Jun. 1, 2006. Proceedings 25. Springer Berlin Heidelberg, 2006, https://doi.org/10.1007/11761679_29.

* cited by examiner

SECURE MULTI-PARTY COMPUTATION AND COMMUNICATION

FIELD

The embodiments described herein pertain generally to private and secure multi-party computation and communication. More specifically, the embodiments described herein pertain to private and secure multi-party computation and communication algorithms or operations for the parties to jointly generate noise in a secure mechanism to achieve a desired level of data privacy protection for differential privacy protocols or algorithms.

BACKGROUND

Differential privacy (DP) protocols and algorithms have been used to provide robust data privacy protection. For each interactive query or operation from a user to a dataset, DP protocols and algorithms may provide a certain level of data privacy protection (e.g., referred to as a differential privacy guarantee). Secure multi-party computation (MPC) algorithms or operations may be executed on multiple datasets owned or hosted by multiple parties, and the results may be distributed over the parties. Each party may individually add or inject noise into its dataset or into the query results of its dataset to achieve a desired level of data privacy protection for DP protocols or algorithms; however, the utility of the end results is likely to be inconsistent between the parties due to the noise added by the other party or parties.

SUMMARY

Features in the embodiments disclosed herein may provide secure MPC algorithms or operations for the parties to jointly generate noise data in a secure mechanism to achieve a level of data privacy protection for the DP protocols or algorithms. For example, two parties may jointly operate on their datasets to obtain the results or the shares of the results, and the noise data may be generated during the MPC operations and added to the results or shares to achieve a level of data privacy protection for the DP protocols or algorithms, instead of each party individually adding or injecting noise data into its dataset or into the query results of its dataset.

Features in the embodiments disclosed herein may provide efficient distributed algorithms or protocols for generating shares of random noise to secure data privacy against semi-honest parties. Features (e.g., joint noise generation, etc.) in the embodiments disclosed herein may provide a distributed implementation of the privacy-preserving statistical datasets whose data privacy may be obtained by perturbing the true result of a dataset query by adding a desired or predetermined amount of random binomial noise.

It is to be understood that in a semi-honest security model, all the parties may follow the private join operation and the computing protocol honestly while trying to extract more information from or regarding the other party's input dataset. Features in the embodiments disclosed herein may provide security with regard to a semi-honest and computationally bounded adversary.

In one example embodiment, a method for protecting data privacy in secure multi-party computation and communication is provided. The method includes determining a differential privacy configuration. The differential privacy configuration includes at least a first parameter and a second parameter. The method also includes determining a number of iterations based on the first parameter and the second parameter, and for each of the number of iterations generating a random value and a random noise data; generating a first message and a second message based on the random value and the random noise data; and performing a transfer based on the first message, the second message, and an input data to output one of the first message and the second message. The method further includes generating a first noise data based on the random noise data in each of the number of iterations; generating a first share based on a first dataset and a second dataset; applying the first noise data to the first share; and constructing a result based on the first share and a second share.

In another example embodiment, a method for protecting data privacy in secure multi-party computation and communication is provided. The method includes determining a differential privacy configuration. The differential privacy configuration includes at least a first parameter and a second parameter. The method also includes determining a number of iterations based on the first parameter and the second parameter, and for each of the number of iterations generating a random value, and performing a transfer based on a first message, a second message, and the random value to receive one of the first message and the second message. The method further includes generating a first noise data based on the received one of the first message and the second message in each of the number of iterations, generating a first share based on a first dataset and a second dataset, applying the first noise data to the first share, and constructing a result based on the first share and a second share.

In yet another example embodiment, a non-transitory computer-readable medium having computer-executable instructions stored thereon is provided. The instructions, upon execution, cause one or more processors to perform operations including determining a differential privacy configuration. The differential privacy configuration includes at least a first parameter and a second parameter. The operations also include determining a number of iterations based on the first parameter and the second parameter, and for each of the number of iterations generating a random value and a random noise data; generating a first message and a second message based on the random value and the random noise data; and performing a transfer based on the first message, the second message, and an input data to output one of the first message and the second message. The operations further include generating a first noise data based on the random noise data in each of the number of iterations, generating a first share based on a first dataset and a second dataset, applying the first noise data to the first share, and constructing a result based on the first share and a second share.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
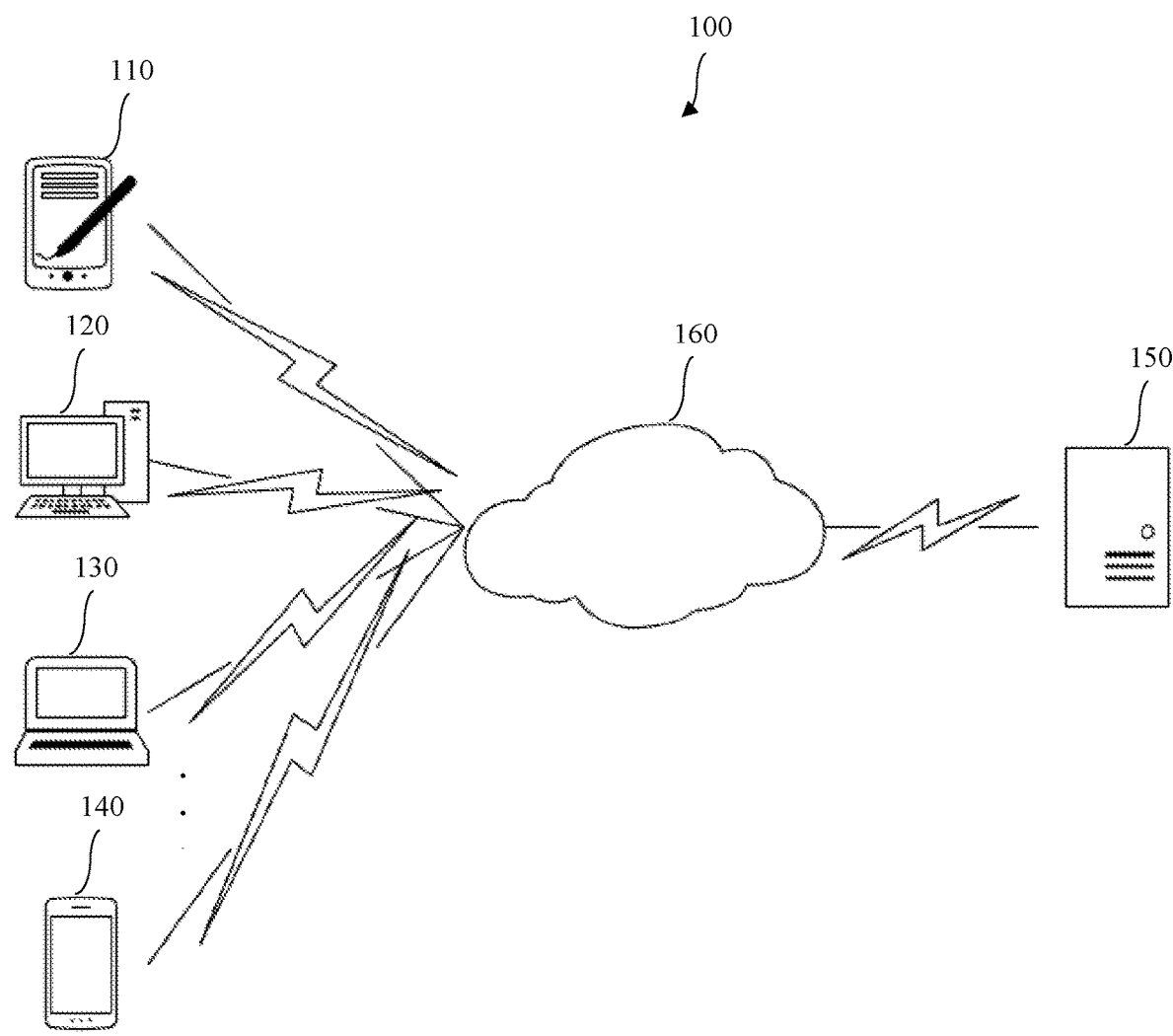
FIG. 1 is a schematic view of an example secure computation and communication system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "data set" or "dataset" is a term of art and may refer to an organized collection of data stored and accessed electronically. In an example embodiment, a dataset may refer to a database, a data table, a portion of a database or data table, etc. It is to be understood that a dataset may correspond to one or more database tables, of which every column of a database table represents a particular variable or field, and each row of the database table corresponds to a given record of the dataset. The dataset may list values for each of the variables, and/or for each record of the dataset. It is also to be understood that a dataset may also or alternatively refer to a set of related data and the way the related data is organized. In an example embodiment, each record of a dataset may include field(s) or element(s) such as one or more predefined or predetermined identifications (e.g., membership identifications, user identifications, etc., such as user's name, e-mail address, phone numbers, etc.), and/or one or more attributes or features or values associated with the one or more identifications. It is to be understood that any user's identification(s) and/or user's data described in this document are allowed, permitted, and/or otherwise authorized by the user for use in the embodiments described herein and in their proper legal equivalents as understood by those of skill in the art.

As referenced herein, "inner join" or "inner-join" is a term of art and may refer to an operation or function that includes combining records from datasets, particularly when there are matching values in a field common to the datasets. For example, an inner join may be performed with a "Departments" dataset and an "Employees" dataset to determine all the employees in each department. It is to be understood that in the resulting dataset (i.e., the "intersection") of the inner join operation, the inner join may contain the information from both datasets that is related to each other. An outer join, on the other hand, may also contain information that is not related to the other dataset in its resulting dataset. A private inner join may refer to an inner join operation of datasets of two or more parties that does not reveal the data in the intersection of datasets of the two or more parties.

As referenced herein, "hashing" may refer to an operation or function that transforms or converts an input (a key such as a numerical value, a string of characters, etc.) into an output (e.g., another numerical value, another string of characters, etc.). It is to be understood that hashing is a term of art and may be used in cyber security application(s) to access data in a small and nearly constant time per retrieval.

As referenced herein, "MPC" or "multi-party computation" is a term of art and may refer to a field of cryptography with the goal of creating schemes for parties to jointly compute a function over the joint input of the parties while keeping respective input private. It is to be understood that, unlike traditional cryptographic tasks where cryptography may assure security and integrity of communication or storage when an adversary is outside the system of participants (e.g., an eavesdropper on the sender and/or the receiver), the cryptography in MPC may protect participants' privacy relative to each other.

As referenced herein, "ECC" or "elliptic-curve cryptography" is a term of art and may refer to a public-key cryptography based on the algebraic structure of elliptic curves over finite fields. It is to be understood that the ECC may allow smaller keys compared to non-EC cryptography to provide equivalent security. It is also to be understood that "EC" or "elliptic curve" may be applicable for key agreement, digital signatures, pseudo-random generators, and/or other tasks. Elliptic curves may be indirectly used for encryption by combining a key agreement between/among the parties with a symmetric encryption scheme. Elliptic curves may also be used in integer factorization algorithms based on elliptic curves that have applications in cryptography.

As referenced herein, "decisional Diffie-Hellman assumption" or "DDH assumption" is a term of art and may refer to a computational complexity assumption about a certain problem involving discrete logarithms in cyclic groups. It is to be understood that the DDH assumption may be used as a basis to prove the security of many cryptographic protocols.

As referenced herein, "elliptic-curve Diffie-Hellman" or "ECDH" is a term of art and may refer to a key agreement protocol or a corresponding algorithm that allows two or more parties, each having an elliptic-curve public-private key pair, to establish a shared secret over an unsecured channel. It is to be understood that the shared secret may be directly used as a key or to derive another key. It is also to be understood that the key, or the derived key, may then be used to encrypt or encode subsequent communications using a symmetric-key cipher. It is further to be understood that ECDH may refer to a variant of the Diffie-Hellman protocol using elliptic-curve cryptography.

As referenced herein, "homomorphic" encryption is a term of art and may refer to a form of encryption that permits users to perform computations on encrypted data without first decrypting it. It is to be understood that the resulting computations of homomorphic encryption are left in an encrypted form which, when decrypted, result in an identical output to that produced had the operations been performed on the unencrypted data. It is also to be understood that the homomorphic encryption can be used for privacy-preserving outsourced storage and computation, which may allow data to be encrypted and out-sourced to commercial cloud environments for processing, all while encrypted. It is further to be understood that an additively homomorphic encryption or cryptosy stem may refer to a form of encryption or cryptosystem that, given only the public key and the encryption of message m1 and message m2, one can compute the encryption of m1+m2.

As referenced herein, "secret sharing" or "secret splitting" is a term of art and may refer to cryptographic actions or algorithms for generating a secret, breaking the secret into multiple shares, and distributing the shares among multiple parties, so that only when the parties bring together their respective shares can the secret be reconstructed. It is to be understood that secret sharing may refer to actions or algorithms for distributing a secret among a group, in such a way that no individual holds any intelligible information about the secret, but when a sufficient number of individuals combine their "shares", the secret may be reconstructed. It is also to be understood that whereas insecure secret sharing may allow an attacker to gain more information with each share, secure secret sharing may be "all or nothing", where "all" may mean the necessary number of shares.

As referenced herein, a "semi-honest" adversary is a term of art and may refer to a party who may try corrupting parties but follow the protocol as specified. It is to be understood that the "semi-honest" party may be a corrupt party that runs a present protocol honestly but may try learning messages received from another party and/or parties for purposes e.g., beyond those intended by the protocol.

As referenced herein, "differential privacy" or "DP" is a term of art and may refer to a standard, a protocol, a system, and/or an algorithm for publicly sharing information regarding a dataset by describing patterns of groups of elements within the dataset while withholding information about individual users listed in the dataset. It is to be understood that differential privacy may refer to a constraint on algorithms used to release aggregate information about a statistical dataset or database to a user, which limits the disclosure of private information of records for individuals whose information is in the dataset or database.

The following is a non-limiting example of the context, setting, or application of differential privacy. A trusted data owner (or data holder or curator, such as a social media platform, a website, a service provider, an application, etc.) may have stored a dataset of sensitive information about individuals (e.g., the dataset includes records/rows of individuals). Each time the dataset is queried (or operated, e.g. analyzed, processed, used, stored, shared, accessed, etc.), there may be a chance or possibility of an individual's privacy being compromised (e.g., probability of data privacy leakage or privacy loss). Differential privacy may provide a rigorous framework and security definition for algorithms that operate on sensitive data and publish aggregate statistics to prevent an individual's privacy from being compromised by, e.g., resisting linkage attacks and auxiliary information, and/or supplying a limit on a quantifiable measure of harm (privacy leakage, privacy loss, etc.) incurred by individual record(s) of the dataset.

It is to be understood that the above requirement of the differential privacy protocol or algorithm may refer to a measure of "how much data privacy is afforded (e.g., by a single query or operation on the input dataset) when performing the operations or functions?" A DP parameter "E" may refer to a privacy budget (i.e., a limit of how much data privacy it is acceptable with leaking), e.g., indicating a maximum difference between a query or operation on dataset A and the same query or operation on dataset A' (that differs from A by one element or record). The smaller the value of E is, the stronger the privacy protection is for the multi-identification privacy-protection mechanism. Another DP parameter "δ" may refer to a probability, such as a probability of information being accidentally leaked. In an example embodiment, a required or predetermined numeric value of $\epsilon$ may range from at or about 1 to at or about 3. The required or predetermined numeric value of δ may range from at or about $10^{-10}$ (or at about $10^{-8}$) to at or about $10^{-6}$. Yet another DP parameter sensitivity may refer to a quantified amount for how much noise perturbation may be required in the DP protocol or algorithm. It is to be understood that to determine the sensitivity, a maximum of possible change in the result may need to be determined. That is, sensitivity may refer to an impact a change in the underlying dataset may have on the result of the query to the dataset.

As referenced herein, "differential privacy composition" or "DP composition" is a term of art and may refer to the total or overall differential privacy when querying (or operating, e.g., analyzing, processing, using, storing, sharing, accessing, etc.) a particular dataset more than once. DP composition is to quantify the overall differential privacy (which may be degraded in view of the DP of a single query or operation) when multiple separate queries or operations are performed on a single dataset. It is to be understood that when a single query or operation to the dataset has a privacy loss L, the cumulative impact of N queries (referred to as N-fold composition or N-fold DP composition) on data privacy may be greater than L but may be lower than L*N. In an example embodiment, an N-fold DP composition may be determined based on an N-fold convolution operation of the privacy loss distribution. For example, a DP composition of two queries may be determined based on a convolution of the privacy loss distribution of the two queries. In an example embodiment, the number N may be at or about 10, at or about 25, or any other suitable number. In an example embodiment, $\epsilon$, $\delta$, sensitivity, and/or the number N may be predetermined to achieve a desired or predetermined data privacy protection goal or performance.

As referenced herein, "binomial distribution" in probability theory and statistics is a term of art and may refer to a discrete probability distribution of the number of successes in a sequence of n independent experiments, each asking a yes-no question, and each with its own Boolean-valued outcome: success (with probability p) or failure (with probability q=1−p). It is to be understood that Gaussian noise in the signal processing field may refer to a signal noise that has a probability density function equal to that of the normal distribution (i.e., the Gaussian distribution). In other words, the values that the Gaussian noise may take comply with a normal distribution (i.e., the Gaussian distribution). Similarly, binomial noise may refer to a signal noise that has a probability density function equal to that of the binomial distribution.

It is to be understood that the differential privacy requirements may be achieved via adding or injecting noise into the dataset studiously to form data anonymous, which may allow data users to execute all possible or useful statistical analysis on the dataset without identifying any personal information. It is also to be understood that adding controlled noise from a predetermined distributions (binomial distribution, Laplace distribution, normal/Gaussian distribution, etc.) may be a way of designing differentially private algorithms. It is further to be understood that adding noise may be useful for designing private protection mechanisms for real-valued functions on sensitive data.

As referenced herein, a "ring" is a term of art and may refer to an algebraic structure that generalizes fields: multiplication need not be commutative and multiplicative inverses need not exist. That is, a ring may be a set equipped with two binary operations satisfying properties analogous to those of addition and multiplication of integers.

As referenced herein, for cryptography, "oblivious transfer" is a term of art and may refer to an algorithm or protocol or operation in which a sender may transfer at least one of potentially many pieces of information to a receiver, but remains unaware of, unmindful of, or otherwise ignorant of what piece or pieces (if any) of information has been transferred. One form of oblivious transfer is "1-2 oblivious transfer" or "1 out of 2 oblivious transfer" for private and secure multi-party computation. For example, in a 1-2 oblivious transfer protocol or algorithm, the sender has two messages $m_0$ and $m_1$, and wants to ensure that the receiver only learns one. The receiver has a bit b and wishes to receive $m_b$ without the sender learning b. Oblivious transfer may be generalized to "1 out of n oblivious transfer" where a receiver gets exactly one dataset element without the sender getting to know which element was queried, and without the receiver knowing anything about the other elements that were not retrieved. A 1-out-of-n oblivious transfer protocol or algorithm may be defined as a natural generalization of a 1-out-of-2 oblivious transfer protocol or algorithm. For example, a sender has n messages, and the receiver has an index i, and the receiver wishes to receive the i-th among the sender's messages, without the sender learning i, while the sender wants to ensure that the receiver receive only one of the n messages.

FIG. 1 is a schematic view of an example secure computation and communication system 100, arranged in accordance with at least some embodiments described herein.

The system 100 may include terminal devices 110, 120, 130, and 140, a network 160, and a server 150. It is to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services to users using one or more of the terminal devices 110, 120, 130, and 140. The server 150 may be implemented by a distributed server cluster including multiple servers or may be implemented by a single server.

A user may use one or more of the terminal devices 110, 120, 130, and 140 to interact with the server 150 via the network 160. Various applications or localized interfaces thereof, such as social media applications, online shopping services, or the like, may be installed on the terminal devices 110, 120, 130, and 140.

It is to be understood that software applications or services according to the embodiments described herein and/or according to the services provided by the service providers may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that when a service is not performed remotely, the system 100 may not include the network 160, but include only the terminal device 110, 120, 130, and 140 and/or the server 150.

It is further to be understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
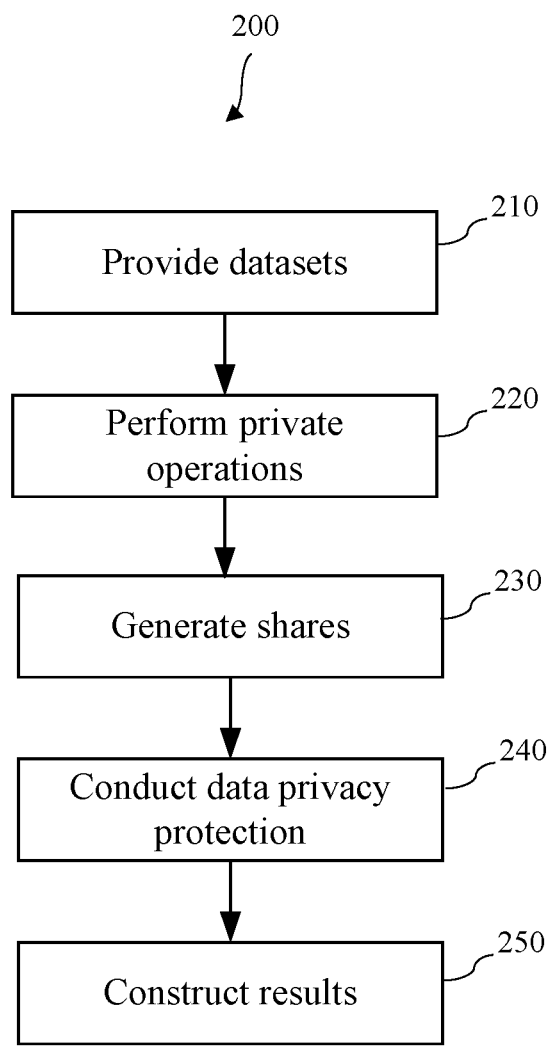
FIG. 2 is a flow chart illustrating an example processing flow for protecting data privacy in private and secure multi-party computation and/or communication, in accordance with at least some embodiments described herein.

FIG. 2 is a flow chart illustrating an example processing flow 200 for protecting data privacy in private and secure multi-party computation and/or communication, in accordance with at least some embodiments described herein.

Figure 3:
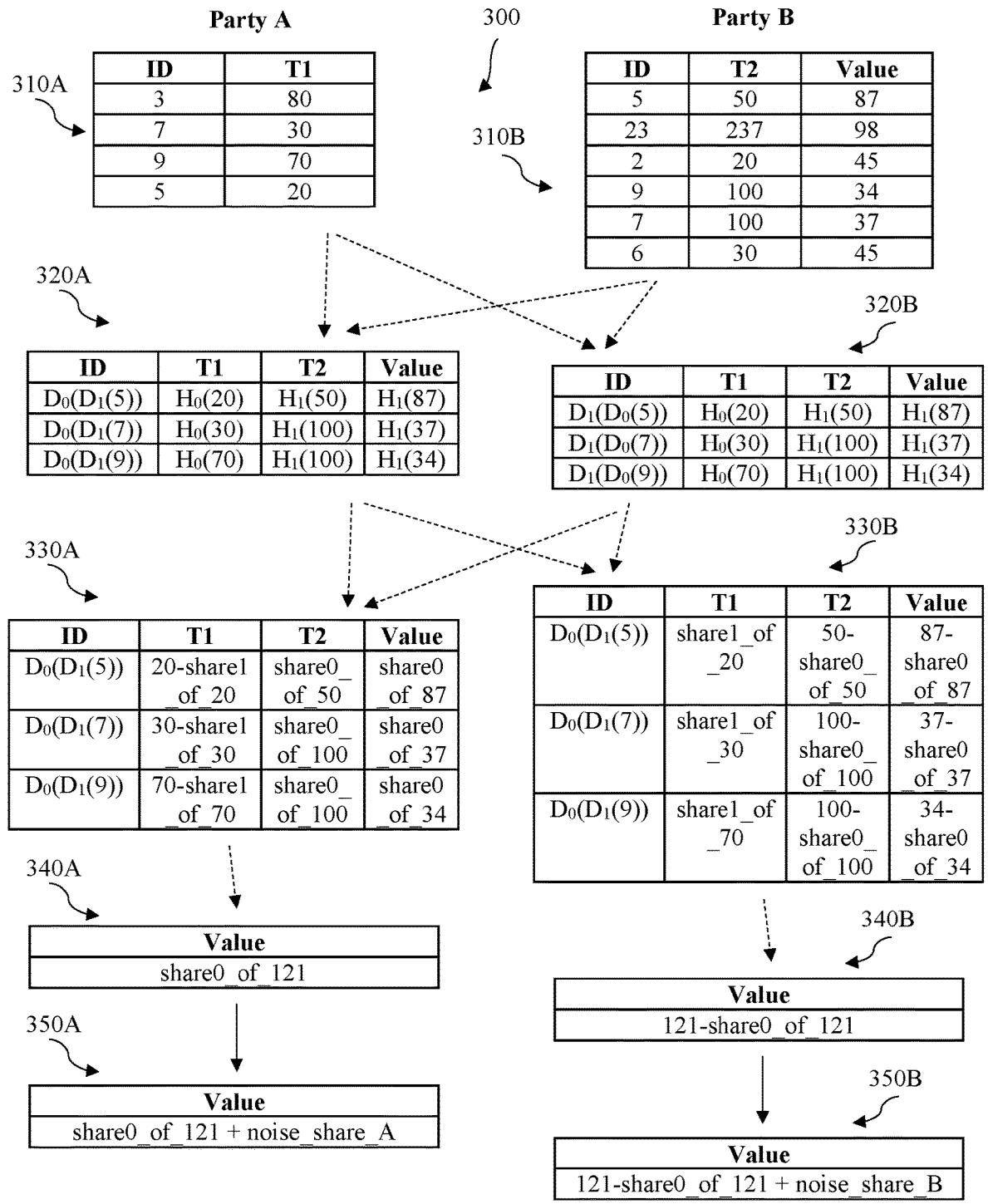
FIG. 3 shows a schematic diagram illustrating an example of the processing flow of FIG. 2, in accordance with at least some embodiments described herein.

FIG. 3 shows a schematic diagram 300 illustrating an example of the processing flow 200 of FIG. 2, in accordance with at least some embodiments described herein.

Figure 5:
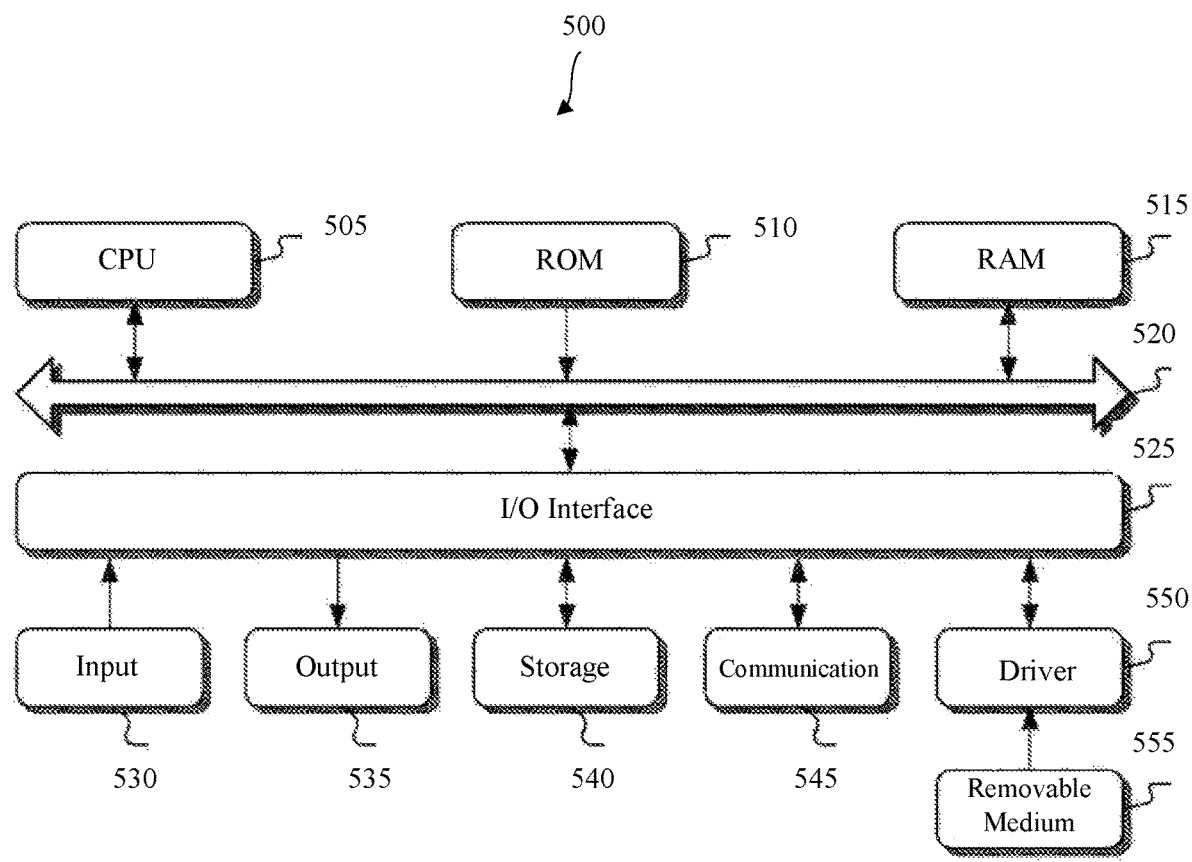
FIG. 5 is a schematic structural diagram of an example computer system applicable to implementing an electronic device, arranged in accordance with at least some embodiments described herein.

It is to be understood that the processing flow 200 disclosed herein can be conducted by one or more processors (e.g., the processor of one or more of the terminal device 110, 120, 130, and 140 of FIG. 1, the processor of the server 150 of FIG. 1, the central processor unit 505 of FIG. 5, and/or any other suitable processor), unless otherwise specified.

It is also to be understood that the processing flow 200 can include one or more operations, actions, or functions as illustrated by one or more of blocks 210, 220, 230, 240, and 250. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 200, operations including initializations or the like may be performed. For example, system parameters and/or application parameters may be initialized. Processing flow 200 may begin at block 210.

At block 210 (Provide dataset), the processor of the respective device may provide a dataset (e.g., 310A of FIG. 3) for Party A, and/or provide a dataset (e.g., 310B of FIG. 3) for Party B. In an example embodiment, the size of the dataset 310A or 310B may include tens or hundreds of thousands elements (or records, rows, etc.). It is to be understood that a size of a dataset may refer to the number of elements (or records, rows, etc.) of the dataset.

In an example embodiment, the dataset 310A includes multiple records (rows), each record including a member or user identification (ID) and a time (T1) indicating e.g., the time (e.g., the starting time or timestamp) at which that member or user has clicked on e.g., a link or the like on Party A's platform. The dataset 310B includes multiple records (rows), each record including a member or user identification (ID), a time (T2) indicating e.g., the time (e.g., the starting time or timestamp) at which that member or user has interacted with Party B's website, and a value (Value) indicating the value of the user for Party B. In an example embodiment, the time (or timestamp) is listed in units of "minutes". It is to be understood that the format, content, and/or arrangement of the dataset 310A and/or 310B are for descriptive purposes only and are not intended to be limiting. For example, each dataset 310A or 310B may have one or more IDs (columns) and/or zero or one or more features or attributes (columns) associated with the ID or IDs.

In an example embodiment, for various reasons pertaining to Party A and/or Party B, it may be prudent to determine e.g., (1) how many members or users who clicked on e.g., a link or the like on Party A's platform, which led to interaction with Party B's website and made valuable interaction, (2) how many members or users who clicked on e.g., a link or the like on Party A's platform, which led to interaction with Party B's website within a certain period of time (e.g., within 70 minutes) after the user clicked on e.g., a link or the like on Party A's platform, and made valuable interaction, and/or (3) the total value of all members or users who clicked on e.g., a link or the like on Party A's platform, which led to interaction with Party B's website within a certain period of time (e.g., within 70 minutes) after the members or users clicked on e.g., a link or the like on Party A's platform and made valuable interaction.

It is to be understood that, for multiple reasons, Party A and/or Party B may not want to reveal to the other party at least portions of data in the dataset 310A and/or the dataset 310B, respectively, and/or in the intersection of the dataset 310A and the dataset 310B. Processing may proceed from block 210 to block 220.

At block 220 (Perform private operations), the processor of the respective device may perform various operations on the dataset 310A and/or the dataset 310B to e.g., generate private intersections of the datasets. For example, the processor may transform the ID (column) of the datasets (310A and/or 310B) using a transforming scheme for Party A and/or a transforming scheme for Party B. The processor may also transform the feature(s) or attribute(s) (column) of the datasets (310A and/or 310B) using a transforming scheme for Party A and/or a transforming scheme for Party B.

It is to be understood that the function or operation to "transform" or of "transforming" a dataset or a portion thereof, e.g., one or more columns (or rows) of a dataset such as one or more identification or feature/attribute fields/columns (or records/rows), etc., may refer to processing (e.g., encrypting, decrypting, encoding, decoding, manipulating, compressing, decompressing, converting, etc.) the dataset or a portion thereof. It is also to be understood that a corresponding "transforming scheme" may refer to an algorithm, protocol, or function of performing the processing (e.g., encrypting, decrypting, encoding, decoding, manipulating, compressing, decompressing, converting, etc.) of the dataset or a portion thereof.

In an example embodiment, the processor may encrypt (or decrypt, encode, decode, manipulate, compress, decompress, convert, etc.) at least the ID of the datasets (310A and/or 310B) using e.g., a key of Party A based on an ECDH algorithm or protocol (represented by the function $D_0(.)$), and/or encrypt (or decrypt, encode, decode, manipulate, compress, decompress, convert, etc.) at least the ID of the datasets (310A and/or 310B) using e.g., a key of Party B based on an ECDH algorithm or protocol (represented by the function $D_1(.)$).

In an example embodiment, the processor may transform the feature(s) or attribute(s) (column) of the datasets (310A and/or 310B) using a transforming scheme for Party A and/or a transforming scheme for Party B. For example, the processor may encrypt (or decrypt, encode, decode, manipulate, compress, decompress, convert, etc.) the feature(s) or attribute(s) (column) of the datasets (310A and/or 310B) using e.g., a key of Party A based on an additively homomorphic encryption algorithm or protocol (represented by the function $H_0(.)$), and/or encrypt (or decrypt, encode, decode, manipulate, compress, decompress, convert, etc.) the feature(s) or attribute(s) (column) of the datasets (310A and/or 310B) using e.g., a key of Party B based on an additively homomorphic encryption algorithm or protocol (represented by the function $H_1(.)$). It is to be understood that the results of the functions $D_0(D_1(p))$ and $D_1(D_0(p))$ may be the same for a same parameter "p".

At block 220, the processor of the respective device may perform search for a match (or an inner join operation, etc.) between the transformed dataset 310A and/or the dataset 310B to obtain or generate an intersection (dataset 320A of FIG. 3) for Party A and to obtain or generate an intersection (dataset 320B of FIG. 3) for Party B.

It is to be understood that for Party A, data in the intersection 320A are also transformed (e.g., encoded, etc.) by Party B (via $D_1(.)$ and $H_1(.)$), and thus the real data from Party B in the intersection 320A is not made known or available to Party A. For Party B, data in the intersection 320B are also transformed (e.g., encoded, etc.) by Party A (via $D_0(.)$ and $H_0(.)$), and thus the real data from Party A in the intersection 320B is not made known or available to Party B. That is, the matching or inner join operation conducted, as described above, is a "private" matching or inner join operation. The processor performs a private identity matching without revealing the intersection of datasets of the two parties. Processing may proceed from block 220 to block 230.

At block 230 (Generate shares), for each attribute or feature (e.g., those elements that are not identifications of the ID field/column) in the datasets (320A and/or 320B), the processor may generate a corresponding mask, and may mask each attribute or feature in the dataset (320A and/or 320B) with its corresponding mask using a masking scheme, to obtain or generate a dataset (secret shares) 330A for Party A and/or a dataset (secret shares) 330B for Party B.

In an example embodiment, each mask is a random number or random plaintext. In an example embodiment, the masking scheme includes a homomorphic operation or computation in an additively homomorphic encryption algorithm or protocol (e.g., addition, subtraction, etc.). For example, as shown in FIG. 3, the mask for the T2 data $H_1(50)$ of the dataset 320A may be represented by "share0_of_50", and the processor may use the mask "share0_of_50" as a secret share for the T2 data $H_1(50)$ in dataset 330A. The processor may also homomorphically compute the share of the T2 data $H_1(50)$ of the dataset 320B such as by subtracting the mask "share0_of_50" from $H_1(50)$, to generate a secret share (e.g., represented by "50-share0 of 50") for the T2 data $H_1(50)$ in dataset 330B for Party B, etc. It is to be understood that since the mask is a random number (e.g., a random number having a length of 64 bits, etc.), the secret share ("share0_of_50", which is a random number) in the dataset 330A for may not reveal the real data to Party A. Similarly, the secret share ("50-share0_of_50", which is also a random number since a result of a number subtracted by a random number is still a random number) in the dataset 330B may not reveal the real data to Party B. It is also to be understood that when the secret share ("share0_of_50") of Party A and the secret share ("50-share0_of_50") of Party B is combined (e.g., added together), the real result data ("50") may then be revealed to the parties.

It is also to be understood that the processor of respective device may conduct private computations (e.g., by executing secure MPC algorithms or operations) on the secret shares in the dataset 330A for Party A to generate a resultant secret share 340A, and/or on the secret shares in the dataset 330B for Party B to generate a resultant secret share 340B.

For example, for Party A, the processor may (1) subtract T1 from T2 (for the dataset 330A), (2) determine whether the result of the subtraction is greater than 0 and less than a predetermined value, (3) if the result of the subtraction at (2) is greater than 0 and less than a predetermined value, set a variable to the secret share of 1 (to represent "True"), which is a random number; if the result of the subtraction at (2) is not greater than 0 or not less than the predetermined value, set the variable to the secret share of 0 (to represent "False"), which is also a random number; and (4) multiply the corresponding variable and the data in the Value field or column, and further sum the result from the multiplication and store or save the results in the Value field of the dataset 340A, to generate the dataset 340A for Party A. Similar to the process for Party A, the processor may also generate the dataset 340B for Party B.

It is to be understood that a result of the secret share of 1 multiplying any value V is still the value V, and that a result of the secret share of 0 multiplying any value V is the secret share of 0. It is also to be understood that during the secure MPC operations to generate the resultant secret shares (340A and/or 340B), the real data remain unknown to Party A and Party B.

It is to be understood that the dataset 340A (a secret share, represented as "share0_of_121") indicates the total value of all users who have clicked on e.g., a link or the like on Party A's platform, resulting in interaction with Party B's website, within a certain period of time (e.g., within 70 minutes) after the respective users clicked on e.g., a link or the like on Party A's platform and made valuable interaction. It is also to be understood that Party A does not know the real data represented by the dataset 340A (the secret share) because the secret share is a random value. Similarly, the dataset 340B (a secret share, represented as "121-share0_of_121") indicates the total value of all users who clicked on e.g., a link or the like on Party A's platform and went to Party B's website, within a certain period of time (e.g., within 70 minutes) after the users clicked on e.g., a link or the like on Party A's platform and made valuable interaction. It is further to be understood that Party B does not know the real data represented by the dataset 340B (the secret share) because the secret share is a random value. Processing may proceed from block 230 to block 240.

At block 240 (Conduct data privacy protection), the processor of the respective device may conduct data privacy protection (see detailed description of FIG. 4) for Party A to add its noise share (represented by "noise_share_A") to its data secret share ("share0_of_121") to generate the dataset 350A of FIG. 3. The processor of the respective device may also conduct data privacy protection for Party B to add its noise share (represented by "noise_share_B") to its data secret share ("121-share0_of_121") to generate the dataset 350B of FIG. 3. Processing may proceed from block 240 to block 250.

At block 250 (Construct results), the processor of the respective device may exchange the dataset 350A with the dataset 350B between Party A and Party B. For example, for Party A, the processor may dispatch or send the dataset 350A to Party B (e.g., to the processor for Party B, etc.), and receive or obtain the dataset 350B from Party B. The processor may also construct the results (121+noise_share_A+noise_share_B) by e.g., adding data in the dataset 350A and data in the received dataset 350B. That is, the total value of all users who clicked on e.g., a link or the like on Party A's platform and went to Party B's website, within a certain period of time (e.g., within 70 minutes) after the users clicked on e.g., a link or the like on Party A's platform and made valuable interaction, is the value (121) plus the noise jointly generated by Party A and Party B (noise_share_A+noise_share_B=noise R).

Similarly, for Party B, the processor may dispatch or send the dataset 350B to Party A, and receive or obtain the dataset 350A from Party A, and construct the results (121+noise_share_A+noise_share_B) by e.g., adding data in the dataset 350B and data in the received dataset 350A. That is, the total value of all users who clicked on e.g., a link or the like on Party A's platform and went to Party B's website, within a certain period of time (e.g., within 70 minutes) after the users clicked on e.g., a link or the like on Party A's platform and made valuable interaction, is the value (121) plus the noise jointly generated by Party A and Party B, which is the same as the result determined by Party A.

It is to be understood that the noise jointly generated by Party A and Party B may be small enough not to significantly impact the accuracy of the real result (e.g., the value 121, etc.) but big enough to provide a certain level of differential privacy protection. That is, the final result may be close enough to the real value (e.g., the value 121, etc.) but different enough such that neither Party A nor Party B knows the real value (e.g., the value 121, etc.), to achieve the desired or predetermined level of differential privacy protection. See the detailed description of FIG. 4.

Figure 4:
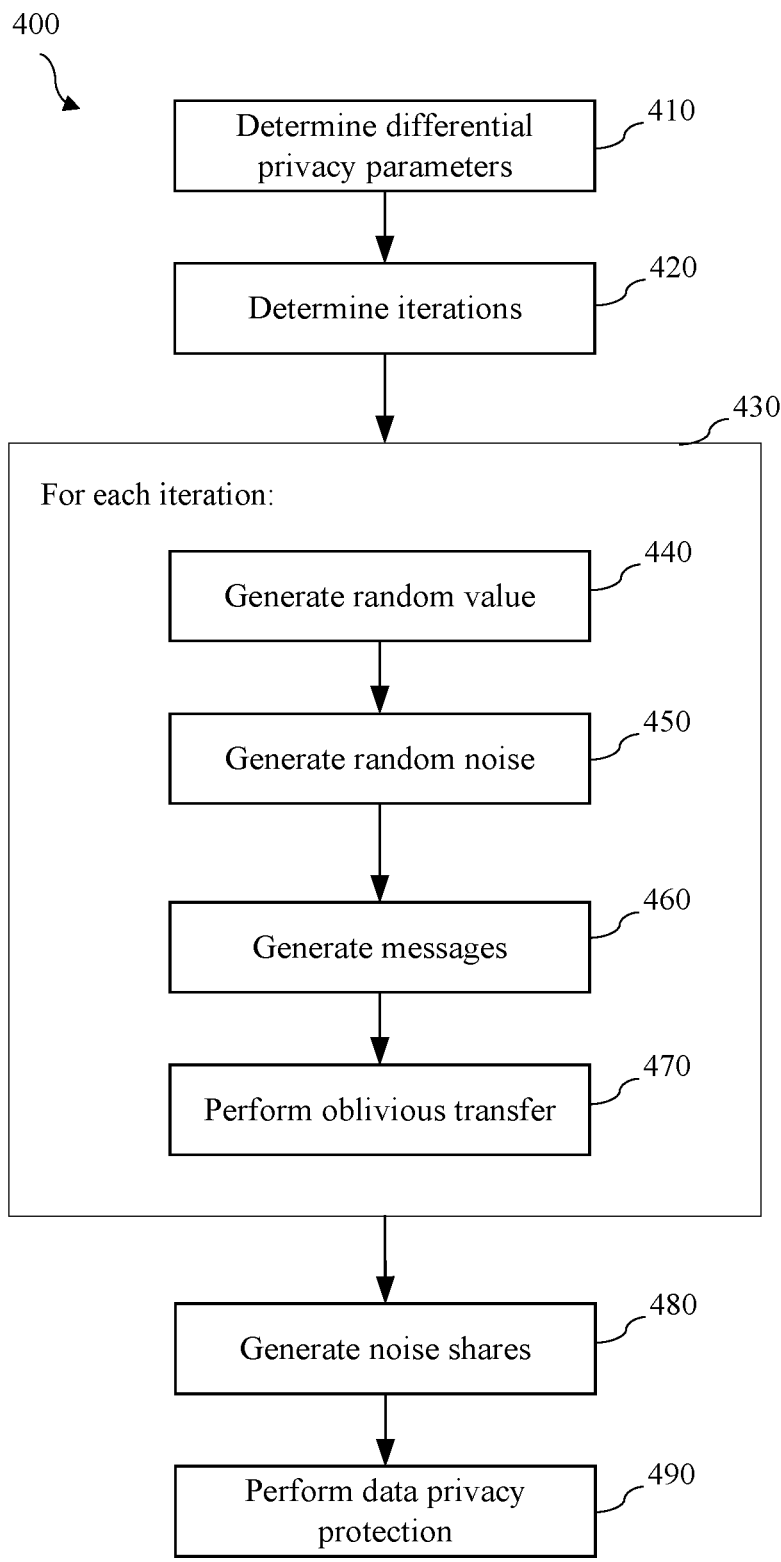
FIG. 4 is a flow chart illustrating an example processing flow for jointly generating noise in private and secure multi-party computation and/or communication, in accordance with at least some embodiments described herein.

FIG. 4 is a flow chart illustrating an example processing flow 400 for jointly generating noise in private and secure multi-party computation and/or communication, in accordance with at least some embodiments described herein.

It is to be understood that the processing flow 400 disclosed herein can be conducted by one or more processors (e.g., the processor of one or more of the terminal device 110, 120, 130, and 140 of FIG. 1, the processor of the server 150 of FIG. 1, the central processor unit 505 of FIG. 5, and/or any other suitable processor), unless otherwise specified.

It is also to be understood that the processing flow 400 can include one or more operations, actions, or functions as illustrated by one or more of blocks 410, 420, 430, 440, 450, 460, 470, 480, and 490. These various operations, functions, or actions may, for example, correspond to software, program code, or program instructions executable by one or more processors that cause the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 400, operations including initializations or the like may be performed. For example, system parameters and/or application parameters may be initialized from the results at block 230 of FIG. 2. It is to be understood that the processes in the processing flow 400 may be a part of the processes in the block 240 of FIG. 2. Processing flow 400 may begin at block 410.

At block 410 (Determine differential privacy parameters), the processor of the respective device may provide or obtain one or more of parameters for a desired or predetermined differential privacy (DP) protection. In an example embodiment, the one or more of parameters may include a DP data privacy budget E (i.e., a limit of how much data leakage is acceptable), a DP probability of data privacy leakage $\delta$, a number K of queries or operations on the dataset or datasets (DP composition), a DP sensitivity (e.g., an impact a change in the underlying dataset may have on the result of the query to the dataset), and/or a probability P (to be described in detail below) of a random variable to be equal to a desired or predetermined value, etc. It is to be understood that the sequence or order of the parameters may not be limited to the examples provided in the embodiments disclosed herein. It is also to be understood that one or more of the parameters may be predetermined to achieve a desired or predetermined data privacy protection goal or performance. Processing may proceed from block 410 to block 420.

At block 420 (Determine iterations), the processor of the respective device may determine a number N of iterations (to be used in block 430) based on one or more of the parameters provided or determined at block 410 for Party A and/or Party B. In an example embodiment, when the number K is 1, the sensitivity is 1, and the probability P is 0.5, the number N may be set to $8*\log(2/\delta)/\epsilon^2$ to achieve the level of data privacy defined or determined by the parameters ($\epsilon$, $\delta$, K, sensitivity, and/or P, etc.). Processing may proceed from block 420 to block 430. It is to be understood that block 430 includes blocks 440, 450, 460, and/or 470.

At block 430 (For each iteration), the processor of the respective device may perform the processes in blocks 440, 450, 460, and/or 470 for each of the N iterations to generate portions of the noise share for Party A and/or portions of the noise share for Party B.

At block 440 (Generate random value), the processor of the respective device may generate a random value $a_A$ for Party A and/or a random value $a_B$ for Party B, with the probability P provided or determined at block 410. In an example embodiment, $a_A$ or $a_B$ may be a random bit, with $a_A$ or $a_B$ being equal to 1 with the probability P being equal to 0.5, and being equal to 0 with a probability (1−P) being equal to 0.5. It is to be understood that the probability P (provided or determined at block 410) may be any other suitable probabilities other than 0.5. The random value $a_A$ or $a_B$ may be any other suitable values other than 0 or 1. Processing may proceed from block 440 to block 450.

At block 450 (Generate random noise), the processor may generate a random number r for Party A. In an example embodiment, the random number r may have a length ("1") of 64 bits. In an example embodiment, the length of the random number r may ensure that the operations (e.g., of the additive secret share) are over the ring (an algebraic structure). It is also to be understood that the value of the random number r may be relatively small (e.g., about or less than 10, about or less than 100, etc.) compared with the data (represented by secret shares, see description of block 490, which may be a value typically at or above tens of a thousand), to ensure that the accuracy of the data is not significantly compromised. It is further to be understood that there are no operations performed for Party B at block 450. Processing may proceed from block 450 to block 460.

At block 460 (Generate messages), the processor may generate messages (to be used at block 470) for Party A based on the random value $a_A$ determined at block 440 and the random number/noise r determine at block 450. In an example embodiment, for a 1-2 oblivious transfer to be conducted at block 470, when the random value $a_A$ is 0, the processor may generate messages $s_0$ and $s_1$ such that each message of the pair $(s_0, s_1)$ is equal to $((-r) \bmod 2^1, (-r+1) \bmod 2^1)$, respectively, for which r is the random number generated at block 450, 1 is the length of r, and "mod" is a "modulo" operation (a binary operation that returns the remainder or signed remainder of a division, after one number is divided by another); when the random value $a_A$ is 1, the processor may generate messages so and Si such that each message of the pair $(s_0, s_1)$ is equal to $((-r+1) \bmod 2^1, (-r) \bmod 2^1)$, respectively. It is to be understood that the features or configurations in such example embodiment may ensure that the final noise R (to be described in detail below) may be a result of a logical operation (such as an exclusive "OR" operation, etc.) of the noise shares. It is to be understood that similar to r, the massages $(s_0, s_1)$ are also random numbers/noises. It is also to be understood that when a 1−n oblivious transfer to be conducted at block 470, and/or when the random value $a_A$ is a value other than 0 or 1, the messages $s_0$ and $s_1$ may be generated in a different manner. It is further to be understood that there is no operations performed for Party B at block 460. Processing may proceed from block 460 to block 470.

At block 470 (Perform oblivious transfer), the processor of respective device may perform an oblivious transfer using input messages from Party A (generated at block 460 for Party A) and input value from Party B (generated at block 440 for Party B), to output one of the input messages (from Party A) "x" to Party B based on the input value from Party B. In an example embodiment, the processor may perform a 1-2 oblivious transfer using input messages ($s_0$, $s_1$) from Party A and input value $a_B$ from Party B, to output one of the messages ($s_0$, $s_1$) based on the value $a_B$. For example, when $a_B$ is equal to 0, $s_0$ is outputted to Party B by executing the 1-2 oblivious transfer algorithm. When $a_B$ is equal to 1, $s_1$ is outputted to Party B by executing the 1-2 oblivious transfer algorithm. It is to be understood that when executing an oblivious transfer algorithm, Party A may not know the value of $a_B$ (or which message is outputted to Party B), and Party B may not know the rest of the messages (in Party A) that are not outputted to Party B.

The processes of blocks 440, 450, 460, and 470 may be repeated until each of the N iterations is processed. Processing may proceed from block 430 to block 480.

At block 480 (Generate noise shares), the processor of respective device may generate a share $R_A$ of a noise R for Party A and/or generate a share $R_B$ of the noise R for party B. In an example embodiment, the share $R_A$ for Party A may be equal to a sum of the random number/noise (e.g., a sum of r mod $2^l$ for each of the N iterations, for which l is the length of the random number r) generated at block 450 for each of the N iterations. The share $R_B$ for Party B may be equal to a sum of the output (e.g., a sum of x mod $2^l$ for each of the N iterations) determined at block 470 for each of the N iterations. In an example embodiment, the noise R may be constructed by e.g., adding the noise shares ($R_A$ and $R_B$, etc.). In an example embodiment, the noise R may be a result of a logical operation (such as an exclusive "OR" operation, etc.) on the noise shares ($R_A$ and $R_B$, etc.). It is to be understood that the noise R may be a binomial noise (that complies with a binomial distribution) when being generated by following the processes of the processing flow 400. Processing may proceed from block 480 to block 490.

At block 490 (Perform data privacy protection), the processor of respective device may add the noise share (e.g., $R_A$, etc.) to the data share (e.g., the secret share in the dataset 340A of FIG. 3, etc.) to generate the data share with added noise (e.g., the secret share in 350A, etc.) for Party A. The processor of respective device may add the corresponding noise share (e.g., $R_B$, etc.) to the data share (e.g., the secret share in the dataset 340B, etc.) to generate the data share with added noise (e.g., the secret share in 350B, etc.) for Party B. It is to be understood that due to the oblivious transfer conducted at block 470, Party A may not know the noise share $R_B$ of Party B, and Party B may not know the noise share $R_A$ of Party A.

It is to be understood that when constructing the result (see description of block 250 of FIG. 2) by combining the data share with added noise from Party A and the data share with added noise from Party B, the result may be the real result (e.g., the value of 121) plus the noise R, which is jointly generated by Party A (via $R_A$) and Party B (via $R_B$). It is also to be understood that after constructing the result (see description of block 250 of FIG. 2), Party A or Party B or both Party A and Party B may get a same result (e.g., the real value 121 plus the noise R).

It is also to be understood that the introduced noise R (added to the results of the MPC operations) may achieve the desired or predetermined level of DP protection defined by the parameters ($\epsilon$, $\delta$, K, sensitivity, and/or P, etc.) with consistent results. For example, the desired or predetermined level of DP protection defined by the parameters ($\epsilon$, $\delta$, K, sensitivity, and/or P, etc.) may be achieved by adding controlled noise from predetermined distributions (Laplace distribution, Gaussian distribution, etc.) to e.g., the dataset 310A by Party A and/or to the dataset 310B by Party B. However, such mechanism may generate inconsistent results between Party A (the result includes a noise generated by Party B) and Party B (the result includes a noise generated by Party A) since Party A and Party B generate their corresponding noise individually. With the features of the embodiments disclosed herein, instead of adding noise individually to the dataset 310A by Party A and/or to the dataset 310B by Party B to achieve the desired or predetermined level of DP protection defined by the parameters ($\epsilon$, $\delta$, K, sensitivity, and/or P, etc.), shares of the noise R (jointly generated by Party A and Party B) may be added to the secret data shares of Party A and/or Party B to achieve the same, almost identical, or similar level of DP protection, with consistent results (Party A and/or Party B may have a result with a same noise R). It is to be understood that the noise R (jointly generated by Party A and Party B) may be small enough not to significantly impact the accuracy of the real result (e.g., the value 121, etc.) but big enough to provide the level of DP protection defined by the parameters ($\epsilon$, $\delta$, K, sensitivity, and/or P, etc.). That is, the final result may be close enough to the real value (e.g., the value 121, etc.) but different enough such that neither Party A nor Party B knows the real value (e.g., the value 121, etc.), and the DP protection defined by the parameters ($\epsilon$, $\delta$, K, sensitivity, and/or P, etc.) may be achieved.

It is further to be understood that in an example embodiment, noise may be individually added to the dataset 310A by Party A and/or to the dataset 310B by Party B to achieve a first level of DP protection, and then the noise R (jointly generated by Party A and Party B) may be further added to the secret data shares of Party A and/or Party B to achieve a second level (e.g., a level higher or better than the first level) of DP protection.

FIG. 5 is a schematic structural diagram of an example computer system 500 applicable to implementing an electronic device (for example, the server or one of the terminal devices shown in FIG. 1), arranged in accordance with at least some embodiments described herein. It is to be understood that the computer system shown in FIG. 5 is provided for illustration only instead of limiting the functions and applications of the embodiments described herein.

As depicted, the computer system 500 may include a central processing unit (CPU) 505. The CPU 505 may perform various operations and processing based on programs stored in a read-only memory (ROM) 510 or programs loaded from a storage device 540 to a random-access memory (RAM) 515. The RAM 515 may also store various data and programs required for operations of the system 500. The CPU 505, the ROM 510, and the RAM 515 may be connected to each other via a bus 520. An input/output (I/O) interface 525 may also be connected to the bus 520.

The components connected to the I/O interface 525 may further include an input device 530 including a keyboard, a mouse, a digital pen, a drawing pad, or the like; an output device 535 including a display such as a liquid crystal display (LCD), a speaker, or the like; a storage device 540 including a hard disk or the like; and a communication device 545 including a network interface card such as a LAN card, a modem, or the like. The communication device 545 may perform communication processing via a network such as the Internet, a WAN, a LAN, a LIN, a cloud, etc. In an embodiment, a driver 550 may also be connected to the I/O interface 525. A removable medium 555 such as a magnetic disk, an optical disk, a magneto-optical disk, a semiconductor memory, or the like may be mounted on the driver 550 as desired, such that a computer program read from the removable medium 555 may be installed in the storage device 540.

It is to be understood that the processes described with reference to the flowchart of FIGS. 2 and 4 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 545, and/or may be installed from the removable medium 555. The computer program, when being executed by the central processing unit (CPU) 505, can implement the above functions specified in the method in the embodiments disclosed herein.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of aspects can be combined with each other.

Aspect 1. A method for protecting data privacy in secure multi-party computation and communication, the method comprising: determining a differential privacy configuration, the differential privacy configuration including at least a first parameter and a second parameter; determining a number of iterations based on the first parameter and the second parameter; for each of the number of iterations: generating a random value and a random noise data, generating a first message and a second message based on the random value and the random noise data, and performing an oblivious transfer based on the first message, the second message, and an input data to output one of the first message and the second message; generating a first noise data based on the random noise data in each of the number of iterations; generating a first share based on a first dataset and a second dataset; applying the first noise data to the first share; and constructing a result based on the first share and a second share.

Aspect 2. The method of aspect 1, wherein the differential privacy configuration includes at least a third parameter, and the number of iterations is determined based on the first parameter, the second parameter, and the third parameter.

Aspect 3. The method of aspect 2, wherein the differential privacy configuration includes at least a fourth parameter, and the number of iterations is determined based on the first parameter, the second parameter, the third parameter, and the fourth parameter.

Aspect 4. The method of aspect 3, wherein the differential privacy configuration includes at least a fifth parameter, and the number of iterations is determined based on the first parameter, the second parameter, the third parameter, the fourth parameter, and the fifth parameter.

Aspect 5. The method of any one of aspects 1-4, wherein in each of the number of iterations, the generating of the random value includes generating the random value with a probability of the random value being a desired value.

Aspect 6. The method of any one of aspects 1-5, wherein the first noise data is a sum of the random noise data in each of the number of iterations.

Aspect 7. The method of any one of aspects 1-6, further comprising: generating a second noise data based on the outputted one of the first message and the second message in each of the number of iterations; and applying the second noise data to the second share.

Aspect 8. The method of aspect 7, wherein the first message and the second message are respectively noise data, and the second noise data is a sum of the outputted one of the first message and the second message in each of the number of iterations.

Aspect 9. A method for protecting data privacy in secure multi-party computation and communication, the method comprising: determining a differential privacy configuration, the differential privacy configuration including at least a first parameter and a second parameter; determining a number of iterations based on the first parameter and the second parameter; for each of the number of iterations: generating a random value, and performing an oblivious transfer based on a first message, a second message, and the random value to receive one of the first message and the second message; generating a first noise data based on the received one of the first message and the second message in each of the number of iterations; generating a first share based on a first dataset and a second dataset; applying the first noise data to the first share; and constructing a result based on the first share and a second share.

Aspect 10. The method of aspect 9, wherein the differential privacy configuration includes at least a third parameter, and the number of iterations is determined based on the first parameter, the second parameter, and the third parameter.

Aspect 11. The method of aspect 10, wherein the differential privacy configuration includes at least a fourth parameter, and the number of iterations is determined based on the first parameter, the second parameter, the third parameter, and the fourth parameter.

Aspect 12. The method of aspect 11, wherein the differential privacy configuration includes at least a fifth parameter, and the number of iterations is determined based on the first parameter, the second parameter, the third parameter, the fourth parameter, and the fifth parameter.

Aspect 13. The method of any one of aspects 9-12, wherein in each of the number of iterations, the generating of the random value includes generating the random value with a probability of the random value being a desired value.

Aspect 14. The method of any one of aspects 9-13, wherein the received one of the first message and the second message is a noise data; the first noise data is a sum of the received one of the first message and the second message in each of the number of iterations.

Aspect 15. The method of any one of aspects 9-14, further comprising: generating a random noise data in each of the number of iterations; generating a second noise data based on the random noise data generated in each of the number of iterations; and applying the second noise data to the second share.

Aspect 16. The method of aspect 15, wherein the second noise data is a sum of the random noise data in each of the number of iterations.

Aspect 17. A non-transitory computer-readable medium having computer-executable instructions stored thereon that, upon execution, cause one or more processors to perform operations comprising: determining a differential privacy configuration, the differential privacy configuration including at least a first parameter and a second parameter; determining a number of iterations based on the first parameter and the second parameter; for each of the number of iterations: generating a random value and a random noise data, generating a first message and a second message based on the random value and the random noise data, and performing an oblivious transfer based on the first message, the second message, and an input data to output one of the first message and the second message; generating a first noise data based on the random noise data in each of the number of iterations; generating a first share based on a first dataset and a second dataset; applying the first noise data to the first share; and constructing a result based on the first share and a second share.

Aspect 18. The computer-readable medium of aspect 17, wherein the differential privacy configuration includes at least a third parameter, a fourth parameter, and a fifth parameter, and the number of iterations is determined based on the first parameter, the second parameter, the third parameter, the fourth parameter, and the fifth parameter.

Aspect 19. The computer-readable medium of aspect 17 or aspect 18, wherein in each of the number of iterations, the generating of the random value includes generating the random value with a probability of the random value being a desired value.

Aspect 20. The computer-readable medium of any one of aspects 17-19, wherein the operations further comprise: generating a second noise data based on the outputted one of the first message and the second message in each of the number of iterations; and applying the second noise data to the second share.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for protecting data privacy in secure multi-party computation and communication, the method comprising:
   determining a differential privacy configuration, the differential privacy configuration including at least a first parameter and a second parameter;
   determining a number of iterations based on the first parameter and the second parameter;
   for each of the number of iterations:
      generating a random value, and
      performing a transfer based on a first message, a second message, and the random value to receive one of the first message and the second message;
   generating a first noise data based on the received one of the first message and the second message in each of the number of iterations;
   generating a first share based on a first dataset and a second dataset;
   applying the first noise data to the first share; and
   constructing a result based on the first share and a second share.

2. The method of claim 1, wherein the differential privacy configuration includes at least a third parameter, and the number of iterations is determined based on the first parameter, the second parameter, and the third parameter.

3. The method of claim 2, wherein the differential privacy configuration includes at least a fourth parameter, and the number of iterations is determined based on the first parameter, the second parameter, the third parameter, and the fourth parameter.

4. The method of claim 3, wherein the differential privacy configuration includes at least a fifth parameter, and the number of iterations is determined based on the first parameter, the second parameter, the third parameter, the fourth parameter, and the fifth parameter.

5. The method of claim 1, wherein in each of the number of iterations, the generating of the random value includes generating the random value with a probability of the random value being a desired value.

6. The method of claim 1, wherein the received one of the first message and the second message is a noise data; the first noise data is a sum of the received one of the first message and the second message in each of the number of iterations.

7. The method of claim 1, further comprising:
   generating a random noise data in each of the number of iterations;
   generating a second noise data based on the random noise data generated in each of the number of iterations; and
   applying the second noise data to the second share.

8. The method of claim 7, wherein the second noise data is a sum of the random noise data in each of the number of iterations.

9. The method of claim 7, further comprising:
   before the performing of the transfer, generating the first message and the second message based on a second random value and the random noise data.

10. The method of claim 1, wherein the performing of the transfer includes performing an oblivious transfer based on the first message, the second message, and the random value.

11. A secure multi-party computation and communication system, the system comprising:
   a memory to store a first dataset; and
   a processor to:
      determine a differential privacy configuration, the differential privacy configuration including at least a first parameter and a second parameter;
      determine a number of iterations based on the first parameter and the second parameter;
      for each of the number of iterations:
         generate a random value, and
         perform a transfer based on a first message, a second message, and the random value to receive one of the first message and the second message;
      generate a first noise data based on the received one of the first message and the second message in each of the number of iterations;
      generate a first share based on the first dataset and a second dataset;
      apply the first noise data to the first share; and
      construct a result based on the first share and a second share.

12. The system of claim 11, wherein the differential privacy configuration includes at least a third parameter, a fourth parameter, and a fifth parameter, and
   the number of iterations is determined based on the first parameter, the second parameter, the third parameter, the fourth parameter, and the fifth parameter.

13. The system of claim 11, wherein in each of the number of iterations, the processor is to further:
   generate the random value with a probability of the random value being a desired value.

14. The system of claim 11, wherein the received one of the first message and the second message is a noise data;
   the first noise data is a sum of the received one of the first message and the second message in each of the number of iterations.

15. The system of claim 11, wherein the processor is to further:
   generate a random noise data in each of the number of iterations;
   generate a second noise data based on the random noise data generated in each of the number of iterations; and
   apply the second noise data to the second share.

16. A non-transitory computer-readable medium having computer-executable instructions stored thereon that, upon execution, cause one or more processors to perform operations comprising:
   determining a differential privacy configuration, the differential privacy configuration including at least a first parameter and a second parameter;
   determining a number of iterations based on the first parameter and the second parameter;
   for each of the number of iterations:
      generating a random value, and
      performing a transfer based on a first message, a second message, and the random value to receive one of the first message and the second message;
   generating a first noise data based on the received one of the first message and the second message in each of the number of iterations;

generating a first share based on a first dataset and a second dataset;
applying the first noise data to the first share; and
constructing a result based on the first share and a second share.

17. The computer-readable medium of claim 16, wherein the differential privacy configuration includes at least a third parameter, a fourth parameter, and a fifth parameter, and
the number of iterations is determined based on the first parameter, the second parameter, the third parameter, the fourth parameter, and the fifth parameter.

18. The computer-readable medium of claim 16, wherein in each of the number of iterations, the generating of the random value includes generating the random value with a probability of the random value being a desired value.

19. The computer-readable medium of claim 16, wherein the received one of the first message and the second message is a noise data;
the first noise data is a sum of the received one of the first message and the second message in each of the number of iterations.

20. The computer-readable medium of claim 16, wherein the operations further comprise:
generating a random noise data in each of the number of iterations;
generating a second noise data based on the random noise data generated in each of the number of iterations; and
applying the second noise data to the second share.

* * * * *